3,373,042
PROCESS FOR CONTINUOUSLY FREEZING COFFEE EXTRACT

Byron Everett Elerath, Mountain Lakes, N.J., and Ezra Pitchon, Flushing, N.Y., assignors to General Foods Corporation, White Plains, N.Y., a corporation of Delaware
No Drawing. Filed Sept. 9, 1964, Ser. No. 395,299
6 Claims. (Cl. 99—71)

ABSTRACT OF THE DISCLOSURE

Coffee extract is partially frozen with agitation into a slush in a first conductive cooling zone, the slush is then placed in a second conductive cooling zone for completion of the freeze, and the completely frozen product is then freeze-dried.

---

This invention relates to an improved method for freezing coffee extract and, more particularly, to a more efficient method for continuously freezing coffee extract which can be freeze-dried to a dark, coffee-like color.

In freeze drying coffee extract by sublimation, it is desireable to produce a dried extract which not only includes a high level of aromatics, but which also has a uniformly dark color resembling that of roasted and ground coffee. In producing this dark coffee-like color, large bodies of coffee extract have been frozen by contact with a continuously moving metal freezing belt which serves to slowly crystallize the freezeable water in said extract to thereby concentrate the liquid extract in relatively thick webs of coffee extract, the webs being concentrated to a substantially eutectic state. Extract which has been frozen in this manner dries to a desirable dark brown color. However, this method of freezing coffee extract has disadvantages due to the long freezing time required to develop the desired ice crystal growth, as well as serious processing problems in handling the extract during and after freezing. Freezing of the extract at these milder freezing temperatures causes sticking of the extract to the metal cooling surface, and retaining means or sidewalls must be provided to retain the liquid extract on the freezing belt as it freezes. Moreover, slow freezing of the coffee extract has produced problems in uniform aroma and solids distribution due to the separation of aromatic oils and solids from the coffee extract. The coffee oils containing the volatile aromas of coffee and coffee solids tend to float to the surface of the extract during freezing thereby causing an impervious film to be formed on the surface of frozen extract which presents a barrier to the removal of water vapor from the interior portions of the extract. Removal of this film allows drying rates to be vastly improved but has the disadvantage of product wastage as well as loss of aromatic constituents which are added to the extract to improve its aroma.

It would, therefore, be desirable if a simpler method than the above procedure could be devised for freezing a large body of aromatic coffee extract which could be freeze-dried at a more efficient rate without aroma loss while at the same time producing a desirable dark-colored soluble coffee.

This invention is founded on the discovery that an aqueous extract of soluble coffee solids containing coffee aromas may be frozen in a first zone to a form which will provide rapid sublimation rates by a process which comprises conductively cooling said extract to below its ice point while continually agitating said liquid to partially freeze water in said extract to an extent wherein said extract will retain its shape and form on standing, said extract being partially frozen while blending the aromas and solids throughout the body of extract to thereby avoid separation of said aromas and solids to the surface of said extract; depositing said partially frozen extract in a second zone in contact with a second conductive cooling surface in a shape having sufficient surface area available for drying, and further conductively cooling the partially frozen extract to below its eutectic point to completely freeze the extract in said shape.

The extract in the first zone can be frozen to an extent wherein the extract retains its shape and form due to partial freezing by any dynamic freezing method, e.g., agitation of the body of coffee extract with a stirrer or agitator means or a swept-surface heat exchanger wherein a thin film of coffee extract is distributed and frozen onto a cylindrical heat exchange surface and continually scraped off this surface by a series of revolving scraper blades. The cooling temperature of the heat exchange surface in the first zone is usually in the range of 15°–25° F., and cooling is continued generally until a product temperature of between 15°–20° F. is achieved. At this product temperature the ice content of the extract will be above 20%, more usually about 30–45%, and the extract may be molded to any shape and form having maximum surface area available for drying while being capable of easy handling. During the partial freezing of the coffee extract in the first cooling zone, it is essential that the extract be continually agitated or stirred to assure a homogeneous blending of the aromas in the coffee, soluble coffee solids and newly formed ice crystals. This agitation of the extract must be carried out in the absence of atmospheric conditions, and is preferably blanketed with an inert gas, such as nitrogen, argon, or carbon dioxide during the partial freeze. The constant agitation during the initial freezing step prevents separation of oils which contain the volatile coffee aromas from the extract and avoids formation of an impervious film at the surface of the extract which will hinder drying of the extract due to sealing available pores or channels in the more interior portions of the extract. After partial freezing is completed and a homogenous distribution of the aromas, coffee solids and ice crystals is achieved throughout the body of liquid extract, the extract is then deposited onto a second cooling zone for completion of the freezing operation. The extract at this point is in the form of a thick sherbert-like material and will retain its shape and form upon standing while still being sufficiently plastic to be molded or deformed into any desired shape.

The partially frozen extract may be extruded from the first zone to the second zone by passing through a die member under sufficient pressure to avoid clogging of the die or may be merely deposited in slab form onto the conductive freezing surface and shaped to any desirable form having a maximum surface area for drying while being capable of easy handling. The partially frozen extract, while capable of retaining its shape and form upon standing, can be easily deformed or imprinted by a series of die members to provide an embossed arrangement having protruding and indented portions which provide a maximum surface area for the driving operation. The protruding portions of the slab will be connected to a common base which may be broken or cut to any convenient size for further handling. The partially frozen extract may be molded into 1/8–3/4 inch squares which are connected by a single base portion having a thickness of about 1/16 inch. The embossed slab is then completely frozen in the second cooling zone and then may be broken into desired sections which can be easily processed according to freeze-drying chamber capacities and product requirements. The partially frozen extract may also be formed into novel shapes, such as coffee beans, and then freeze-dried.

During the partial freezing of the coffee extract in the first cooling zone, it is preferred to slowly freeze the extract in order to develop a larger ice crystal growth thereby assuring a darker colored freeze-dried product. A suitable initial freezing time in the first cooling zone would be 15–20 minutes and at least 10 minutes to partially freeze at least 20% of the available water. Heat removal should be controlled within this stage to a range of 1–3 calories per gm. per cc. per minute and preferably less than 1.5 calories per gm. per cc. per minute. Completion of the freezing may then be accomplished rather quickly in a period of 5–10 minutes to achieve a suitable dark color which approaches the dark color of roasted and ground coffee. Alternatively, the coffee extract may be frozen initially at a rapid rate of say 1–3 minutes and then may be frozen more slowly in the second cooling zone over a period of about 20–30 minutes and at least 115 minutes, the heat removal being at the rate of less than 3 calories per gm. per cc. per minute and preferably about 1.5 calories per gm. per cc. per minute.

To obtain an even darker colored product than that obtained by the above procedure, it is a more specific embodiment of this invention to partially freeze at least 5–10% of the water, remove the ice crystals thus formed by freeze concentration, and then partially freeze the extract in accordance with the above procedure. Freeze concentration has the advantage of removing a portion of the water which must be sublimated during freeze-drying, and at the same time provides a more concentrated extract which tends to give a darker colored coffee product regardless of the manner of freezing. The ice crystals may be separated by passing the partially frozen extract over a foraminous member, say a meshed screen or belt, wherein the liquid coffee extract passes through the openings of the belt or screen while the larger ice crystals are retained. A suitable mesh size for the foraminous member would be 100–200 mesh U.S. Standard Sieve. The foraminous member is preferably made of material having a low heat conductivity thereby preventing temperature changes in the extract during the separation step. About 10–40% of the water content may be removed in this manner. The extract may then be partially frozen again and further concentrated or partially frozen to an extent whereat the extract will retain its shape upon extrusion (30–50% water ice), extruded, and then frozen to a solid state by conductive freezing.

This invention will now be described by reference to the following specific example:

*Example*

Coffee extract containing about 1% by weight expressed coffee oil and about 1.5% of steam volatile aroma was passed through a scraped surface heat exchanger consisting of a 2 foot long stainless steel screw in a jacketed 2 foot by 2 inches diameter shell. Propylene glycol solution chilled to −30° F. was circulated through the jacket.

A batch of 4 gallons of extract was recycled through the heat exchanger for 35 minutes at which time the effluent had acquired the consistency similar to soft ice cream. The ice crystals appeared to be slightly larger than ordinary table salt or sugar. The slush was somewhat thixotropic (flowed through the exit pipeline, but held its shape when at rest). The batch was divided into two parts and further frozen until completely solid in about 20 additional minutes. One portion was formed as a ½″ thick slab, the other as a ribbed slab having the same average weight per area as a ½″ slab, but with ½″ x ½″ ribs extending above a ¼″ thick base.

Each of the above slabs was dried in a freeze dryer at the maximum rate such that the product ice temperature did not exceed −10° F. and the dried portions did not exceed 90° F.

The slab dried in fifteen hours and the ribbed slab in nine hours. Control samples of ½″ slabs formed by freezing similar extract without the slushing step were dried in 17 to 19 hours using the same drying criteria.

Examination of the dried product showed that the usual surface film of an oily or waxy material was not present. The cross sectional color was uniformly dark. When ground through an 8 mesh screen the product appearance was that of porous, irregularly shaped but somewhat spherical chunks. The static frozen liquid extract when dried tended to fracture into platelets of thin cross section.

This invention while being described by reference to a specific example is to be limited only by the scope of the appended claims.

What is claimed is:

1. A process for freezing an aqueous extract of soluble coffee solids containing coffee aromas to a form which will provide rapid sublimation rates on freeze-drying comprising conductively cooling said extract in a first zone to below its ice point while continually agitating said liquid to partially freeze water in said extract to an extent wherein said extract will retain its shape and form on standing, said extract being partially frozen in a substantially inert gaseous atmosphere while blending said aromas and solids throughout the body of extract to thereby avoid separation of said aromas and solids to the surface of said extract; depositing said partially frozen extract in a second conductive cooling zone; further conductively cooling said partially frozen extract to below its eutectic point to completely freeze said extract in said shape; and then freeze-drying said frozen extract.

2. The process of claim 1 wherein the partially frozen extract has at least 20% of its water content in the form of ice.

3. The process of claim 2 wherein the ice content is 30–45%.

4. A process for freezing an aqueous extract of soluble coffee solids containing aromas which when freeze-dried will have a dark, coffee-like color which comprises removing 10–40% of the water in said extract by freeze-concentration, conductively cooling said extract in a first zone to below its ice point while continually agitating said liquid to partially freeze the remaining water in said extract to an extent wherein said extract will retain its shape and form on standing, said extract being partially frozen in a substantially inert gaseous atmosphere while blending said aromas and solids throughout the body of extract to thereby avoid separation of said aromas and solids to the surface of said extract; depositing said partially frozen extract in a second conductive cooling zone and further conductively cooling said partially frozen extract to below its eutectic point to completely freeze said extract in said shape; and then freeze-drying said slush-frozen extract.

5. A process for freezing an aqueous extract of soluble coffee solids containing coffee aromas in preparation for freeze-drying which comprises conductively cooling said extract in a first zone to below its ice point while continually agitating said liquid to partially freeze water in said extract to an extent wherein said extract will retain its shape and form on standing, said extract being partially frozen in a substantially inert gaseous atmosphere at a heat removal rate of 1–3 calories per gm. per cc. per minute while blending said aromas and solids throughout the body of extract to thereby avoid separation of said aromas and solids to the surface of said extract; depositing said partially frozen extract in a second conductive cooling zone; further conductively cooling said partially frozen extract to below its eutectic point to completely freeze said extract in said shape; and then freeze-drying said slush-frozen extract.

6. The process of claim 5 wherein the partially frozen extract is further frozen in the second cooling zone at a heat removal rate of 1–3 calories per gm. per cc. per minute.

References Cited

UNITED STATES PATENTS

| | | | |
|---|---|---|---|
| 1,938,522 | 12/1933 | Grayson | 62—270 |
| 2,292,447 | 8/1942 | Irwin | 99—199 |
| 2,685,783 | 8/1954 | Benscheidt et al. | 99—205 X |
| 3,035,922 | 5/1962 | Mook et al. | 99—71 |
| 3,244,533 | 4/1966 | Clinton et al. | 99—71 |

MAURICE W. GREENSTEIN, *Pirmary Examiner.*